May 27, 1969  S. ADLER  3,445,917
METHOD OF MANUFACTURING STUFFED TOYS
Filed Sept. 14, 1965  Sheet 1 of 4
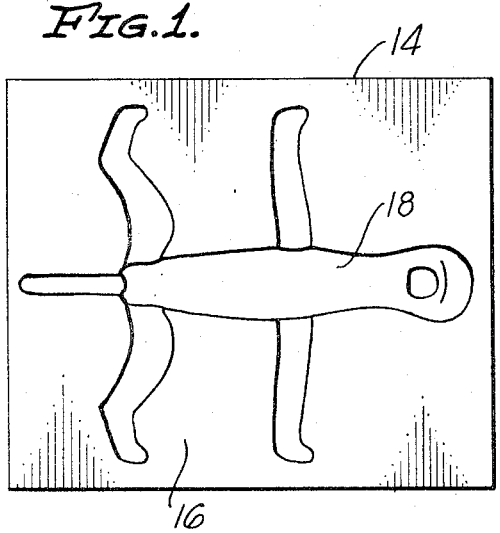
FIG. 1.
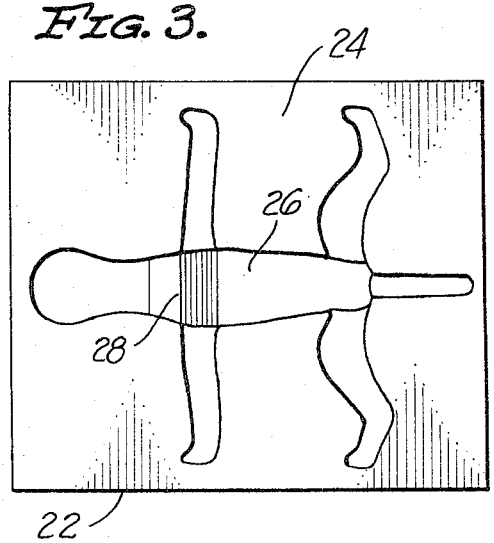
FIG. 3.
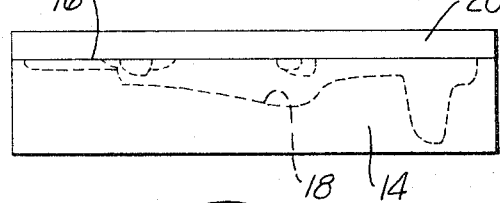
FIG. 2.
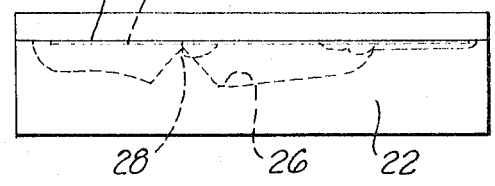
FIG. 4.
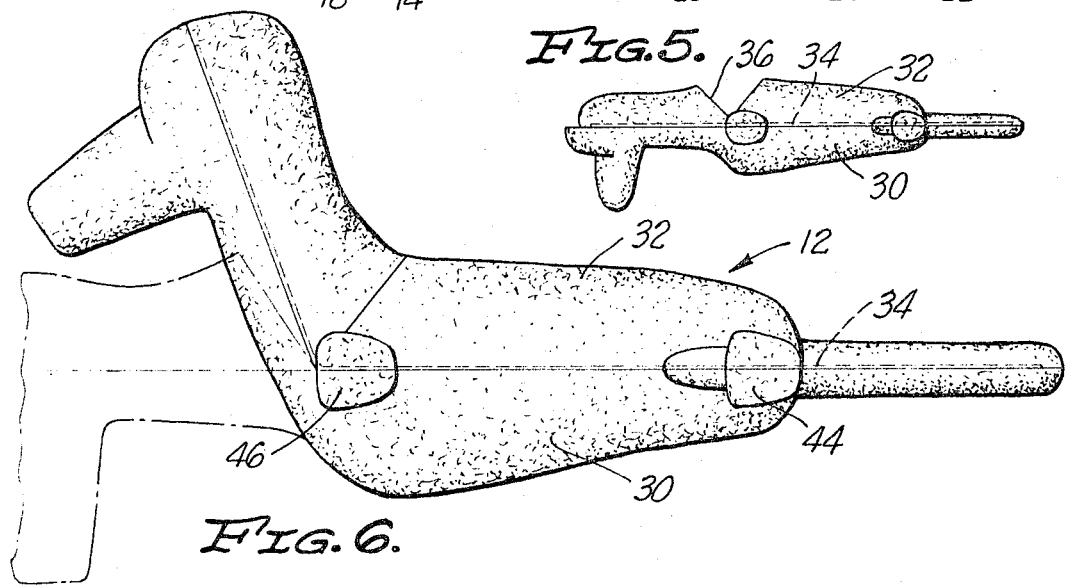
FIG. 5.
FIG. 6.
INVENTOR
SEYMOUR ADLER
BY
EDWARD D. O'BRIAN
ATTORNEY May 27, 1969 S. ADLER 3,445,917
METHOD OF MANUFACTURING STUFFED TOYS
Filed Sept. 14, 1965 Sheet 2 of 4

INVENTOR
SEYMOUR ADLER
BY
EDWARD D. O'BRIAN
ATTORNEY

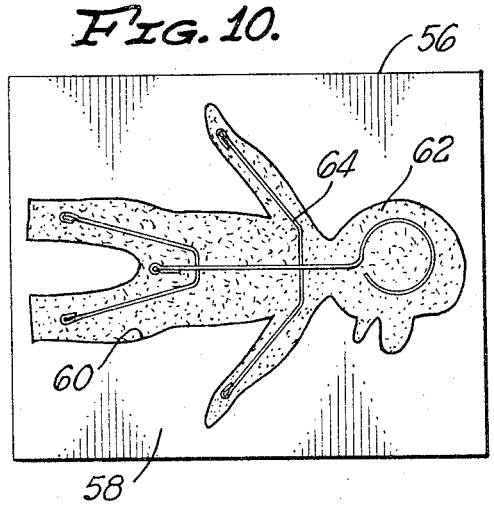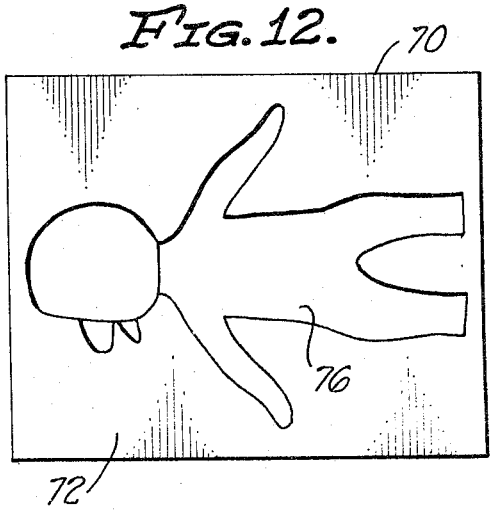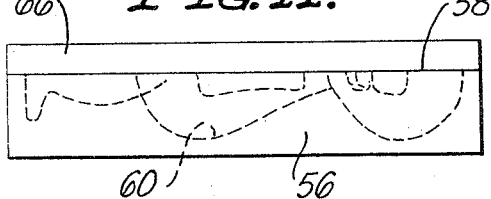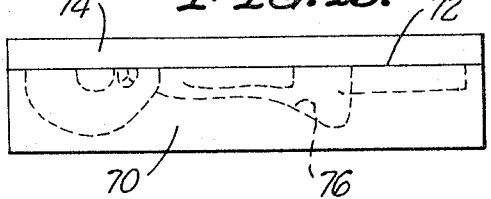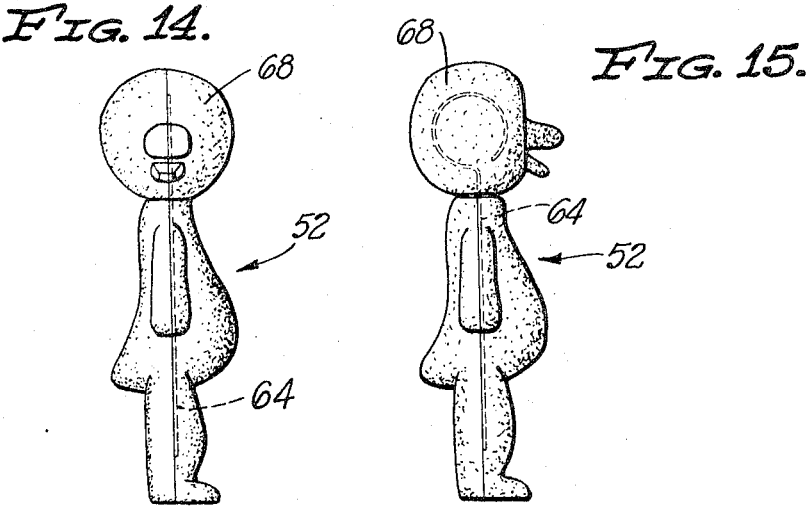
INVENTOR
SEYMOUR ADLER
BY
EDWARD D. O'BRIAN
ATTORNEY May 27, 1969 S. ADLER 3,445,917
METHOD OF MANUFACTURING STUFFED TOYS
Filed Sept. 14, 1965
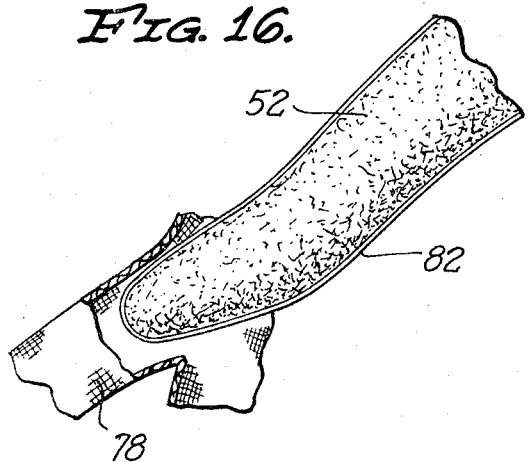
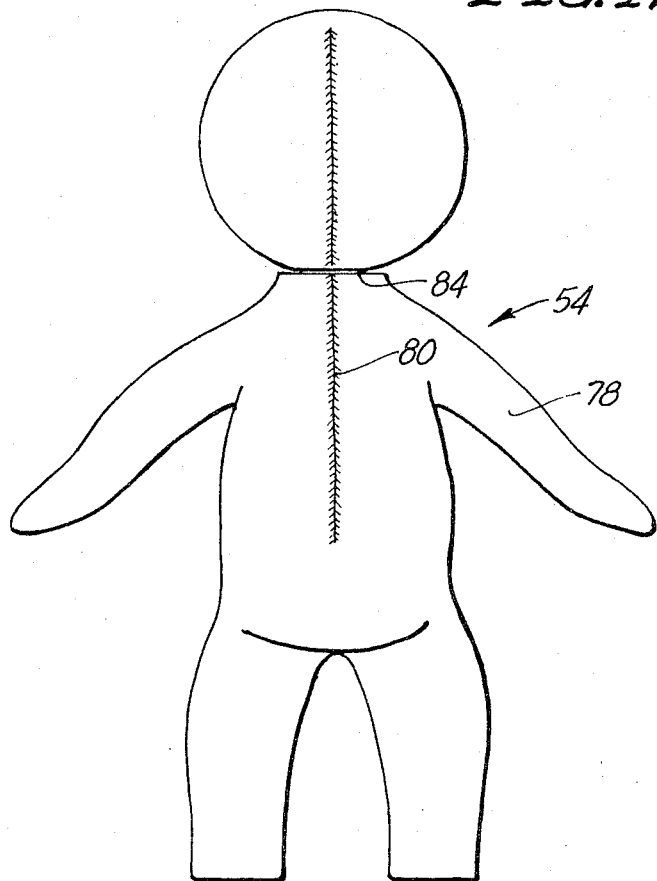
INVENTOR
SEYMOUR ADLER
BY
EDWARD D. O'BRIAN
ATTORNEY

United States Patent Office 3,445,917
Patented May 27, 1969

3,445,917
METHOD OF MANUFACTURING
STUFFED TOYS
Seymour Adler, Los Angeles, Calif., assignor to Mattel,
Inc., Hawthorne, Calif., a corporation of California
Filed Sept. 14, 1965, Ser. No. 487,121
Int. Cl. B32b 31/00; A63h 3/02
U.S. Cl. 29—463                                7 Claims

ABSTRACT OF THE DISCLOSURE

A stuffed toy made by molding stuffing members from pieces of foamed polymer, each member having a flat surface splitting a body and appendages. The surfaces are adhered together with wire at their interface extending from the body into the appendages. The stuffing is then covered with a stretch fabric and appendages are bent to a natural position on the body. In one form a notch is molded in one stuffing member to facilitate bending and in another form the stuffing is cut in to the wire to permit turning an appendage about the axis of the wire.

---

This invention is directed to stuffed toys in the nature of plush toys and particularly to the method of manufacturing same, wherein a molded body of bonded chopped foam is covered with a suitable stretch fabric so as to permit flexibility of the toy.

Stuffed toys are well known in the art. Such stuffed toys have various types of conventional stuffing, including compacted cotton linters, excelsior and the like. Such stuffed toys are conventionally formed by first forming a cloth body of suitable shape and insertion of the stuffing therein. Thus, the shape and contour of the finished stuffed, plush toy is determined by the fabric configuration. Furthermore, conventional fabrics used in this service are substantially non-stretchable so that the overall configuration of the toy is predetermined by the fabric and the toy is relatively inflexible. Toys made by such construction can have a very accurate and aesthetically good shape, but have the disadvantage of not being able to be repositioned from the original shape without serious creasing and stretching of the fabric. Furthermore, toys stuffed with cotton linters, excelsior and the like are not subject to being washed, for the stuffing absorbs a considerable amount of moisture which is difficult to drive out without very extensive periods of drying.

Accordingly, it is an object of this invention to provide a method of making a stuffed toy which is covered by a stretch fabric, such as jersey, so that parts of the toy can be repositioned without causing objectionable stretching and creasing of the fabric.

It is another object of this invention to provide a method of making a stuffed toy having a preformed, molded interior stuffing material which is covered by the stretch fabric so that the stuffing determines the shape of the finished toy.

It is a further object of this invention to provide a method of making a molded stuffing made out of foamed polymer composition material and having one or more wires inserted therein so that the portions of the toy which are repositioned remain in the position to which they are moved.

It is a further object of this invention to provide a method of making a stuffed toy which has its stuffing molded in two separate halves in which the molding is accomplished in a convenient shape and which a wire may be placed with respect to the molded portions in such a manner as to permit later bending of portions thereof so that various portions of the toy remain in the desired position.

It is another object of this invention to provide a method of making a stuffed toy in which the stuffing is molded in suitable shapes to provide easy molding procedures and wherein the molded shapes are repositioned to provide the finished configuration.

It is another object of this invention to provide a method of making a plush toy having a molded stuffing and a stretch fabric covering which is economic to manufacture, excellent in appearance, repositionable into desirable configurations and of long life.

Other objects and advantages of this invention will become apparent from a study of the following portion of the specification, the claims and the attached drawings in which:

FIG. 1 is a top plan view of a mold half arranged for the molding of the bottom half of the stuffing of a toy dog;

FIG. 2 is a side elevational view showing the two mold halves thereof;

FIG. 3 is a top plan view of a mold half arranged for molding the top half of the stuffing of a toy stuffed dog;

FIG. 4 is a side elevational view showing the two mold halves therefor;

FIG. 5 is a side elevational view of the stuffing for a stuffed toy dog as the halves come from the mold and shown lying together;

FIG. 6 is a side elevational view of the two halves of the stuffing for a stuffed toy dog shown assembled together;

FIG. 10 is a top plan view of a mold half for molding half the stuffing for a toy stuffed teddy bear;

FIG. 11 is a side elevational view showing the two mold halves therefor;

FIG. 12 is a top plan view of a mold half for molding the other half for the stuffing for a toy stuffed teddy bear;

FIG. 13 is a side elevational view showing the two mold halves thereof;

FIG. 14 is a side elevational view showing the two stuffing halves for the toy teddy bear in the assembled condition;

FIG. 15 is a side elevational view of the stuffing for a toy stuffed teddy bear showing the stuffing oriented into the form it will occupy after the stuffing is assembled into its stretch fabric covering;

FIG. 16 is an enlarged view showing one of the extremities of the stuffing for the toy stuffed teddy bear being inserted into its covering; and FIG. 17 is a rear elevational view of the completed toy stuffed teddy bear.

As an aid to understanding this invention it can be stated in essentially summary form that it is directed to the method of manufacturing stuffed plush toys. The stuffed toys comprise a stuffing which is molded of chopped foam polymer composition material which is bonded together in the mold and which is molded in body halves in a form which is convenient for molding. A wire may be inserted adjacent the inner surface of one of the halves. The two halves are assembled and bonded together, and alternatively the wire may be adhesively secured therebetween. Thereupon the molded and assembled chopped polymer composition foam stuffing is further formed to the configuration of the finished stuffing. Such configuration is preferably in such form as to make it insertable into a previously assembled stretch fabric covering. Such shaping may include further adhesive securement into the proper shape. Insertion of the formed stuffing into the previously assembled stretch fabric covering includes placement of polymer composition strips over the extremities of the stuffing to enable such extremities to slide easily into the covering. Finishing is completed by enclosing the opening in the cover through which the fully formed stuffing is inserted and by bending the stuffing into a lifelike shape.

Thus, the article comprises a stuffing of two halves of chopped foam polymer composition material bonded into the shape of the stuffing and with a wire inserted therein near the center to maintain the shape of the stuffing, and a covering of stretch fabric which permits flexure of the stuffing without undue stretching and wrinkling of the cover fabric.

The method of manufacture comprises molding the halves of chopped foam polymer composition material and bonding the chopped form together, assembling the wire adjacent to one of the surfaces of one of the halves, adhesively securing the other half in place, bending the assembled stuffing into such shape as to insert it into its covering, together with further adhesive securement, if necessary, assembling the stuffing into a stretch fabric covering which assembly includes the placement of plastic strips to aid such assembly, if necessary, closing the assembly opening in the cover and bending the stuffed plush toy into a life-like configuration.

Figure 7:
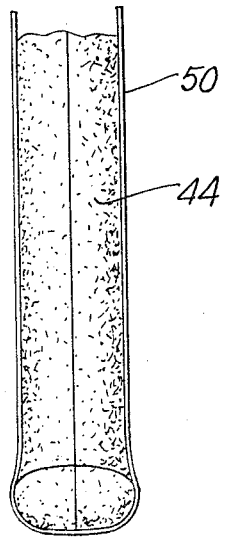
FIG. 7 is an enlargement of an elevational view of one of the legs of the toy stuffed dog ready for the assembly of the stretch covering thereover.
Figure 8:
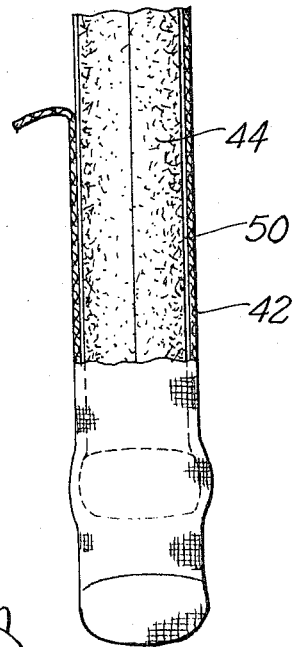
FIG. 8 is a view similar to FIG. 7 showing the covering partially assembled thereover.
Figure 9:
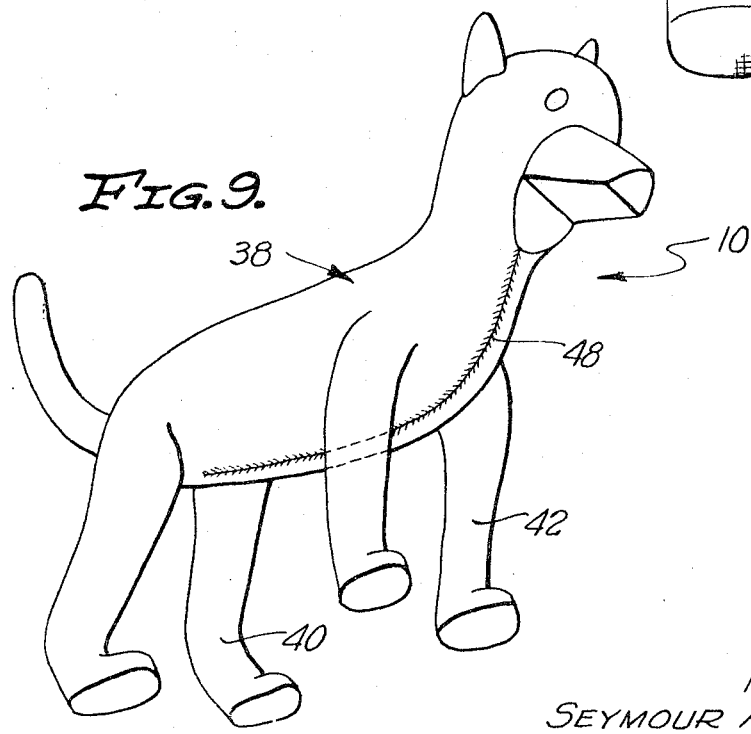
FIG. 9 is an isometric view of the toy stuffed dog in the fully assembled condition.

This invention will be better understood by reference to the following portion of this specification where the drawings are described. Referring now to FIGS. 1 through 9, a stuffed plush dog, together with its method for manufacture will be described. The stuffed plush toy dog is generally indicated at 10 and the finished stuffing for the dog 10 is generally indicated at 12. FIG. 1 shows a lower mold half 14 which has a top surface 16 and a cavity 18 below the top surface 16. Cavity 18 is arranged in a form corresponding to the distorted lower half of the dog stuffing 12 in a preliminary, molded position. In this position the parting line extends through the body of the dog, the legs and tail. Thus the cavity 18 is suitable for creation of the lower half of dog stuffing 12 in a spread-eagle position. Mold half 20 has a planar bottom surface so as to close the cavity 18.

As is shown in FIG. 3, mold half 22 has a substantially planar top surface 24 and cavity 26 extending therebelow. The cavity 26 is arranged to be of suitable configuration as to mold the upper half of the dog stuffing 12, and including the back of the head and neck, the upper half of the back and tail as well as the upper half of the legs. It is to be especially noted that cavity 26 contains projection 28 which is in the form of an inverted V and which is positioned just forward of the front legs of the dog stuffing. Projection 28 forms a notch at the junction between the neck and the upper half of the body so that the finished stuffing 12 can be formed into the proper bodily configuration.

As was described above, chopped foam polymer composition material is used to create the dog stuffing 12. A great deal of scrap foam material is produced in the making of articles wherein a large single piece of foam material is desired. This scrap foam can readily be chopped into small pieces, from slightly smaller than the size of a cherry pit to the size of a cherry, and such sizes are particularly suitable for use in connection with this process. Each of the chopped pieces retains the resiliency in the original foam. Polyurethane foam is the most commonly available polymer composition material in the foam form, but a number of others are also feasible for use in this invention. Several other favorable polymer compositions are disclosed in "Textbook of Polymer Science" by Billmeyer, Interscience, 1962, New York, the entire disclosure of which is incorporated herein by this reference. The most important characteristic is the fact that a suitable bonding agent must be available. The chopped foam polymer composition material is mixed with the bonding agent in a separate vessel so that the bonding agent coats the exterior surfaces of the chopped pieces. In the case of polyurethane foam, an aromatic diisocyanate, such as tolylene diisocyanate, and glycol are suitable. Such is not a usual adhesive, but is a prepolymer mixture for the polyurethane foam. In the presence of water aromatic diisocyanate cross links through the formation of urea linkages. Thus, polyurethane is formed on the surfaces of the chopped foam. Of course, cross linking takes time and is enhanced by the application of heat. Thus the coated chopped parts are dumped into the cavity 18, and mold half 20 is placed thereover. Heat is applied to a sufficient extent to cause cross linking and complete adhesion so that the lower half 30 of stuffing 12 is monolithically produced in the cavity 18. In this case, bonding is accomplished by the addition of additional polymer composition material of the same character as the particular polymer composition of the foam pieces. However, other adhesives can be used which merely have surface adhesion between the foam pieces. Such adhesives are well known and are discussed in "Handbook of Adhesives" by Skeist, Reinhold, 1962, New York, the entire disclosure of which is incorporated herein by this reference. As is mentioned above, the application of heat speeds up cross linking, so it is desirable to apply heat in a proper amount for a proper length of time when the mold is closed.

The making of the upper half 32 in cavity 26 of mold half 22 is similar to that described above. A suitable foam is chopped into appropriately sized pieces, coated with a suitable binder and is dumped into the mold cavity. However, in order to make the finished dog stuffing 12 conformable to a certain position, a wire structure 34 can be inserted into the mold on the top of the stuffing. The wire structure 34 has a longitudinal center section which extends from adjacent the top of the head to nearly the tip of the tail. Furthermore cross wires are secured thereto and extend thereacross. One of the cross wires extends from near the tip of one front leg to near the tip of the other front leg. The other cross wire extends from near the tip of one rear leg to near the tip of the other rear leg. Upon closure of the mold, as is seen in FIG. 4, the wire 34 is bonded into the upper half 32 adjacent the top cover of mold 22. Before the wire 34 is inserted into the mold on top of the chopped foam polymer composition material, it is dipped into or otherwise covered by the same type of bonding material mixed with the individual pieces of foam material. Thereupon the wire 34 is laid upon the top of the foam material in cavity 26, the mold is closed and is subjected to the proper amount of heat for the proper amount of time to cause the bonding reaction to take place. Thus the wire 34 is bonded into the upper half 32 adjacent its planar face.

As is seen in FIG. 5, both the upper and lower halves of the dog stuffing 12 are formed in the mold with substantially planar faces. The leg, body and tail portions correspond with each other to provide a suitable form for the dog stuffing. The projection 28 creates notch 36 in the upper half 32. At assembly of the two halves 30 and 32, the planar faces are coated with the bonding agent, of the same nature as described above. Similarly, the notch 36 is coated with the bonding agent. The two halves 30 and 32 are assembled together, and the neck is bent upwardly to the position shown in FIG. 6. In this position the stuffing 12 is again subjected to adequate heat to set the bonding agent.

Alternatively to placing the wire 34 in the mold cavity 26 on top of the chopped foam polymer composition material therein, the wire can be coated with the bonding agent and placed between the upper and lower halves 32 and 30 at the time of their assembly together. In either case, the wire 34 lies closely adjacent or at the parting surface between the two halves. In this position it is adequately secured, and is properly positioned for proper support of the body and its extremeties when they are bent into various positions.

The external configuration of the finished dog 10 is thus determined by the external surfaces of the dog stuffing 12. This stuffing is resilient in nature and has a proper surface configuration to define the shape of the finished part. The configuration having thus been determined, the covering does not need to supply the function of determining this configuration. The covering is made of fabric 38 which is a stretch fabric suitably cut and sewn to properly fit over the stuffing 12. Such cutting and sewing includes fabric legs 40 and 42 to fit over the stuffing legs 44 and 46, respectively. The shape of the fabric covering 38 corresponds in other suitable and necessary respects to the shape of the dog stuffing 12.

As has been mentioned above, the fabric 38 is a stretch fabric. Preferably it is a knit jersey fabric of sufficient resiliency to provide suitable stretch characteristics to the extent that it is necessary in the present application. The fabric 38 has a stuffing opening, which is closed after insertion by the seam 48. The fabric 38 is open along the line of seam 48, which extends from adjacent the muzzle of the dog along his abdomen to a position adjacent his back legs. By means of this opening, and by means of proper positioning of the appendanges of the dog stuffing 12, the stuffing is inserted into the covering fabric 38. The legs, tail and head of the dog stuffing 12 can be bent into any shape helpful to insert it into the cover.

In order to aid the insertion of the stuffing legs 44 and 46 into the fabric legs 40 and 42, additional aids are necessary. The coefficient of friction between the fabric and stuffing is quite high, and thus it is difficult to simply insert the stuffing legs into the fabric legs. To aid in this process, a body 50 of suitable polymer composition material is laid over the end of each of the stuffing legs, for example, stuffing leg 44. The body 50 may be a bag or the like; in the embodiment shown it is a strip. The body 50 is preferably of polyethylene, or some other similar polymer composition material which is relatively slippery. It is to be noted that a relatively narrow strip is sufficient for this purpose, as contrasted to a complete "bag" or "boot." A body 50 is placed over each of the stuffing legs just prior to the insertion of the stuffing legs into the fabrics legs. It is to be noted that since a relatively narrow strip is adequate, the stuffing legs are, for the most part, against the fabric. This facilitates proper washing and drying of the finished dog 10. Similar results can be achieved with the body 50 being a perforated "boot" or bag. A similar strip is placed over the stuffing tail of the dog to aid in its insertion into the tail portion of the fabric cover.

After the complete insertion, the legs and tail of the dog are reformed into lifelike positions and are maintained thereby means of the wire in the stuffing. Furthermore, the seam 48 is closed by external stitching so that the finished toy stuffed plush dog is completed. As noted above, the dog's appendages are repositioned during insertion of the stuffing into the cover. In view of the fact that the fabric is stretchable, such insertion and later repositioning of the appendages does not cause wrinkling of the frabric and thus the appearance of the finished dog is excellent. Furthermore, repositioning of the appendages into different positions during play with the toy stuffed dog 10, does not cause such excessive bending as to cause excessive stretching or wrinkling of the fabric.

Referring now to FIGS. 10 through 17, another embodiment of the plush stuffed toy is shown. The finished stuffing is shown in FIG. 15 at 52 and the finished toy is shown in FIG. 17 at 54. The toy 54 is in the form of a teddy bear. Referring now to FIGS. 10 through 13, mold half 56 has a planar top surface 58 and cavity 60 therein extending below top surface 58. In FIG. 10, the cavity 60 is shown as being filled with chopped pieces of polymer composition foam material 62 of the type previously described with respect to the stuffing 12. The pieces 62 are treated in the previously described manner, and thus are chopped polymer composition foam material coated with a suitable binder and dumped into the cavity 60. Wire 64 is coated with the same binder and may be placed upon the top pieces 62 before the mold cover 66 is placed therein. Mold cover 66 has a planar bottom surface which engages over the surface 58 so as to permit the forming of a half of the toy teddy bear stuffing 52. It is to be noted that, as previously described, the filled in closed mold is subjected to an adequate amount of heat for a sufficient time to set the binder so as to make monolithic the half of the stuffing 52 molded in cavity 60. Furthermore, the wire 64 need not be placed in the mold, as is indicated in FIG. 10, but may be coated with bonding material and placed between the two halves of the stuffing 52 when they are bonded together. As is shown in FIGS. 10 through 13, the head 68 of the stuffing 52 for the teddy bear 54 is molded at right angles to the position it will assume when oriented in the finished manner.

Mold half 70 has a planar top surface 72 for engagement by mold top 74 and cavity 76. Cavity 76 corresponds to cavity 60 and is provided for the molding of the other half of stuffing 52. Again, the head portion in cavity 76 is molded at right angles to the finally oriented position.

After the two halves of the stuffing 52 are molded, they are bonded together as is indicated in FIG. 14. This bonding is preferably accomplished by the use of the same bonding material, and the application of sufficient heat and pressure to obtain an adequate bond. After such bonding, the neck of the stuffing 52 is cut and the head 68 is turned 90° generally on the axis of the central wire 64.

After the toy teddy bear stuffing 52 is thus completely assembled, it is inserted into its fabric covering 78. Again, the fabric covering 78 is made of stretch fabric, such as a suitable jersey and is sewn into the proper shape to represent the finished form of the toy teddy bear 54. Of course, a seam 80 is left as an opening and is later closed after the insertion. Each of the stuffing arms and legs can be bent in such a direction as is helpful in inserting the stuffing into the covering fabric. Again, each of the appendages of the stuffing 52 have a body 82 of polymer composition material laid thereover. This body 82 is preferably of low coefficient of friction material, such as polyethylene. Thus, it aids in the insertion of the stuffing 52 into the fabric covering 78, for there is a relatively high coefficient of friction between the stuffing and the fabric. This body 82 is preferably a strip which is simply laid around the ends of the appendages and the sides are left open. After the insertion, arms and legs are repositioned and the seam 80 is sewn up and the fabric 78 is pulled tight into the neck slot 84 by suitable stitching. By this means the head 68 retains some of its ability to turn with respect to the remainder of the body, and the relatively loose fabric which permits this turning is hidden in the neck slot 84. The use of a stretch fabric 78 permits the various appendages of the toy teddy bear 54 to be repositioned without excessive stretching and wrinkling of the fabric. Furthermore, since the toy teddy bear stuffing 52 has its own form, yet is resilient, it properly supports the fabric in the desired shape even though the fabric is a stretch fabric. Furthermore, it permits the bending of the appendages during the fitting of the stuffing into the covering. Furthermore, since the neck slot 84 is available for the taking in of fabric, it is considered preferable to form the fabric 78 on the head separately from the fabric 78 on the body and appendages. After these are formed they are separately installed over the various parts, and the seam between the head fabric and body fabric can be inserted into and pulled into the neck slot 84. This method of construction makes the formation of the fabric over the head and the fabric over the remainder of the body more easily accomplished, and the seam is not objectionable.

The importance of the stretchability of the fabric cannot be over emphasized. The stretch fabric tremendously aids in the insertion of the stuffing into the preformed fabric. Furthermore, the stuffing creates the external appearance and configuration of the finished toy, for the stretch fabric is sufficiently resilient to have some tension even after the stuffing is inserted. Thus, the fabric is pulled tight against the stuffing and creates an excellent appearance. However, the stretchability of the fabric clearly aids the insertion for this stretchability permits the insertion of irregular appendages or other portions of the stuffing into a preformed fabric covering and have excellent fits. Furthermore, after the insertion is completed and the covering is closed, the stretch fabric permits the toys to be bent into inumerable different configurations in accordance with the demands of the customer without unsightly stretching or bunching of the cover fabric. Thus, in any configuration the stretch fabric gives an excellent, lifelike surface. As is specified above, the fabric is preferably a stretch jersey. Furthermore, it is preferably a plush pile stretch jersey. A plush pile stretch jersey gives the soft pile finish which is highly desirable and aids in hiding those areas which are stretched during bending. Thus, an even pile surface is presented throughout the entire toy, no matter how it is bent.

The polyethylene bodies over the appendages of the stuffing are used to aid in the insertion of the appendages into the covering, as is described above. It should be clearly noted that an additional advantage is present in the use of strips, as compared to closed pockets or bags of material. The toys of this invention can be washed, and such strips permit the appendages to rapidly dry out, for there is a substantial area of the stuffing of each appendage in direct contact with the plush pile stretch jersey cover fabric. Thus, the toys of this invention can be washed and can be readily dried by conventional means. Such washing and drying will be proper and complete because the water from washing can dry out of the appendages.

This invention having been described in its preferred embodiment, it is clear that it is susceptible to numerous modifications and changes within the skill of the routine artisan without the exercise of the inventive facility. Accordingly, the scope of this invention is defined by the scope of the following claims.

I claim:

1. The process of making a plush toy having a stuffing and a covering, comprising the steps of:
    coating pieces of foamed polymer composition material with a binder;
    molding said coated polymer material into first and second halves of said stuffing to a form wherein each has a flat surface dividing a body portion and appendages;
    coating a wire with a bonding material and placing the wire substantially between the flat surfaces of said stuffing halves to extend from said body portion into said appendages;
    placing bonding material on said flat surfaces and bonding said surfaces together to form a unitary stuffing having a body portion and appendages; and
    covering said stuffing with a stretch fabric and bending selected portions of said stuffing and wire to a desired shape.

2. In a process as defined in claim 1 wherein certain of said appendages are of relatively narrow elongated configuration and wherein said stretch fabric is first formed to define tubular covering portions for said certain appendages; the further step of covering at least a portion of the ends of said certain appendages with a smooth layer of polymer composition to facilitate insertion into said tubular covering portions.

3. The process of making a plush toy stuffing member comprising the steps of:
    coating pieces of foamed polymer composition material with a binder;
    providing at least one mold having a cavity therein shaped to form a notch in the stuffing molded in the cavity;
    molding the stuffing within the cavity including substantially filling the mold cavity with binder coated chopped foam polymer composition material and subjecting the contents of the mold to proper conditions for curing of said binder to cause the pieces in the mold to bond together into a stuffing member;
    placing bonding material within the notch formed in the molded stuffing;
    bending the stuffing member to close the notch and causing said bonding material in the notch to bond so as to maintain the notch closed.

4. The process of making the plush toy having a stuffing comprising the steps of:
    coating pieces of foamed polymer composition material with a binder;
    providing at least one mold having a cavity therein corresponding to the stuffing shape and wherein the cavity forms at least two larger bodies of stuffing connecting together by a neck;
    molding the stuffing in said cavity with the two larger bodies in disoriented position with respect to each other including substantially filling the mold cavity with binder coated chopped foamed polymer composition material and subjecting the contents of the mold to proper conditions for curing said binder to cause the chopped pieces in the mold cavity to bond together into a stuffing form;
    providing a wire within the stuffing form so that the wire extends through the neck of the stuffing form and is bonded to the bodies of material adjacent the neck in the stuffing form; and
    cutting the neck down to the wire and turning one of the bodies with respect to the other so that the bodies are correctly oriented with respect to each other.

5. The process of making a plush toy having a stuffing and a covering comprising the steps of:
    molding a stuffing form having an exterior configuration corresponding to the desired exterior configuration of the plush toy, said configuration including a head and a body separated by a neck;
    providing a connecting member in said neck for securing said head to said body;
    cutting the stuffing of neck to said connecting member between the head and the body;
    providing a covering of stretch fabric corresponding in shape generally to the exterior configuration of said body;
    providing a covering of stretch fabric corresponding in shape generally to the exterior configuration of said head;
    inserting the stuffing head into the stretch fabric covering for said head and inserting the stuffing body into the covering for said stuffing body;
    securing the head covering to the body covering by a seam adjacent to the cut of the neck and pulling the seam into the cut between the head and the body.

6. The process of making a plush toy having a stuffing and a covering, said process comprising the steps of:
    molding a stuffing form material having an exterior configuration corresponding to the desired exterior configuration of the plush toy, said configuration including a body and an appendage on the body, the molding stuffing form being molded with the appendage disoriented with respect to the body, providing a wire within the molding stuffing form extending into the body and into the appendage;
    cutting the stuffing form substantially to the wire between the body and the appendage;
    turning the appendage about the axis of said wire to an oriented position with respect to the body; and covering said stuffing form.

7. The process defined in claim 1 wherein said coated wire is incorporated in one of said stuffing halves, substantially at its flat surface, during the molding of said one stuffing half.

References Cited

UNITED STATES PATENTS

| | | | |
|---|---|---|---|
| 1,644,027 | 10/1927 | O'Neill | 46—156 |
| 1,839,889 | 1/1932 | Palais | 29—416 |
| 2,486,989 | 11/1949 | Schneider. | |
| 2,878,153 | 3/1959 | Hacklander. | |
| 2,968,104 | 1/1961 | Yonezo Ito | 46—156 X |
| 3,357,610 | 12/1967 | Quinby | 156—228 X |

FOREIGN PATENTS

| | | |
|---|---|---|
| 656,087 | 8/1951 | Great Britain. |
| 821,529 | 10/1959 | Great Britain. |
| 604,065 | 8/1960 | Canada. |
| 1,244,459 | 9/1960 | France. |

CHARLIE T. MOON, *Primary Examiner.*

U.S. Cl. X.R.

29—480, 528, 529; 46—158; 156—228; 264—339